April 19, 1932. C. C. FOSS 1,854,648
ROTARY VALVE FOR INTERNAL COMBUSTION ENGINES
Filed Feb. 13, 1930 2 Sheets-Sheet 1

Christian C Foss
Inventor

By Lester L Sargent
Attorney

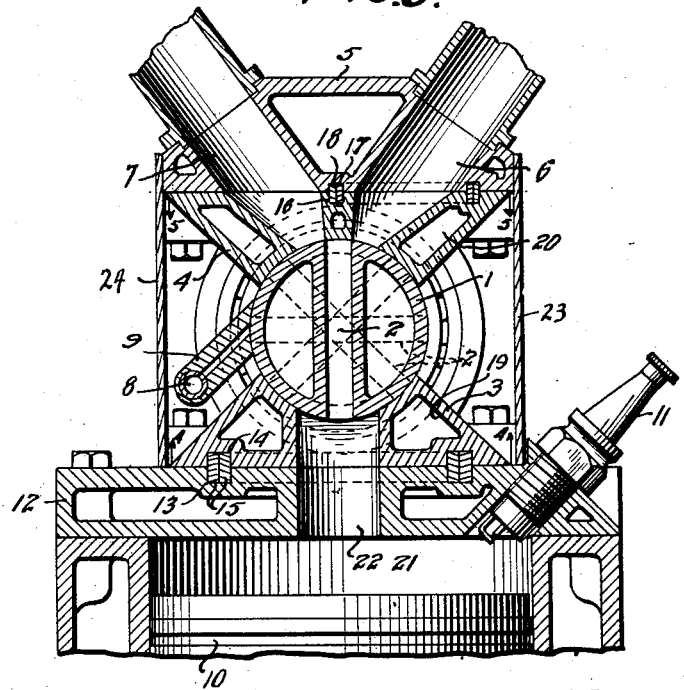
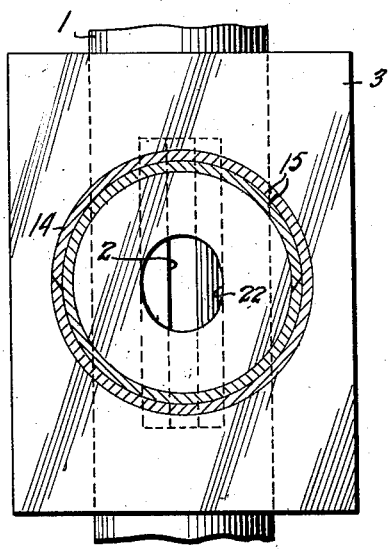
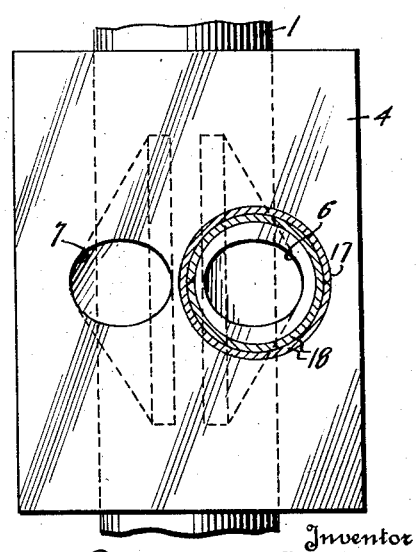

Patented Apr. 19, 1932

1,854,648

UNITED STATES PATENT OFFICE

CHRISTIAN C. FOSS, OF PULASKI, GEORGIA

ROTARY VALVE FOR INTERNAL COMBUSTION ENGINES

Application filed February 13, 1930. Serial No. 428,152.

The object of my invention is to provide a novel rotary valve for internal combustion engines, of simple, efficient and inexpensive construction; to provide novel and efficient means for mounting said valve in an improved form of bearings, to provide novel means for retaining the bearings in their proper position; and especially to provide a rotary valve having bearings which are of relatively narrow width as compared with the head plate of the engine cylinder; to provide improved means for mounting the spark plugs; and to provide suitable means, if required, for cooling the bearings in which the rotary valve is mounted and to provide effective means for the intake of fuel and for the discharge of the products of combustion.

I attain these and other objects of my invention by the mechanism illustrated in the accompanying drawings, in which,—

Fig. 3 is a transverse vertical section on line 3—3 of Fig. 1;

Fig. 4 is a horizontal section looking upward on line 4—4 of Fig. 3; and

Fig. 5 is a horizontal section looking down on the line 5—5 of Fig. 3.

Like numerals designate like parts in each of the several views.

Figure 1:
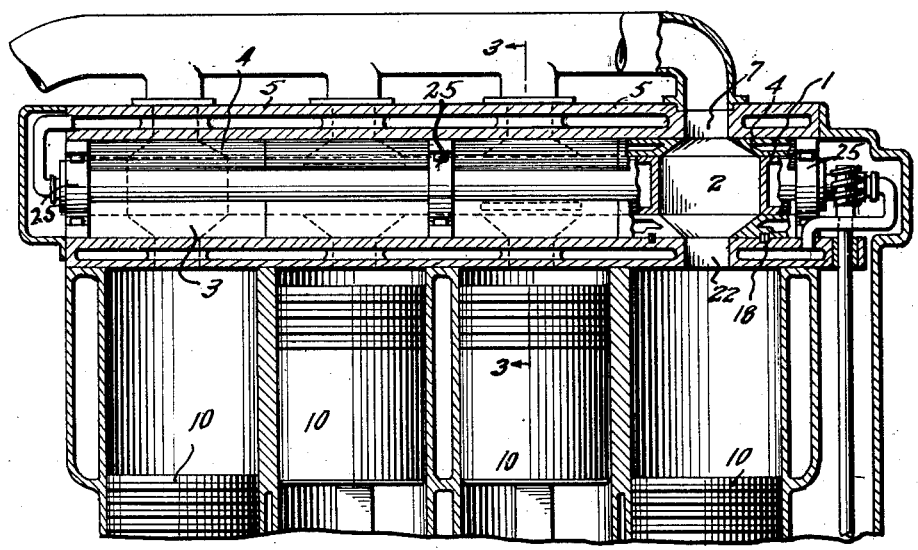
Figure 1 is a view of the entire engine, portions thereof being shown in side elevation and other portions in vertical section.

Referring to the accompanying drawings, I provide a rotary valve 1 having ports 2, one for each cylinder, said ports being in communication with the passage 22 leading into the combustion chamber 21 and adapted to be alternately placed in communication with the intake port 6 and the exhaust port 7, as illustrated in Fig. 3. The rotary valve is mounted in the bottom bearing 3 and the upper bearing 4, the bottom bearing in turn being mounted on the cylinder head or plate 12, and the upper bearing being mounted on or under the cylinder head 5.

I provide a novel oiling device 9 mounted on the hollow shaft 8, this oiling device being the subject of a separate and copending application for patent.

I provide conventional spark plugs 11 mounted at an angle of approximately forty-five degrees in the plate 12, as shown in Fig. 3, in the top of the engine cylinder 21, which cylinder also contains a suitable piston 10. The cylinder head or plate 12 which preferably is suitably water cooled is provided with an annular groove 13 and the bottom bearing 3 is provided with a correspondingly positioned annular groove 14 in which suitable packing rings 15 are mounted, these rings functioning to retain the bottom bearing in its proper position without requiring a rigid fastening for the bottom bearing to the plate 12. The packing rings are split at different or offset portions of the rings. They function not only to hold the bottom bearing in its proper place but also by expanding tightly in the grooves in which they are seated they function as a means of holding the compression in the cylinder and prevent escape of the compressed gases. I also provide an annular groove 16 in the upper bearing 4 encircling the intake port 6, and a correspondingly positioned annular groove 17 in the cylinder head 5 likewise encircling the intake port and suitable packing rings 18 positioned in the aforesaid grooves for functioning both to retain the upper bearing 4 in its proper position relative to the cylinder head and also functioning to prevent escape of fuel from the intake port. Packing rings 18 also function as a means of holding compression and preventing escape of the gases from around the intake port. These packing rings are split at different or offset portions allowing them to expand to fit tightly in the annular grooves in which they are seated.

I preferably provide a water jacket 19 in the lower bearing 3 and a similar water jacket 20 in the upper bearing 4 but within the contemplation of my invention to omit the water cooling of these bearings if desired.

Figure 2:
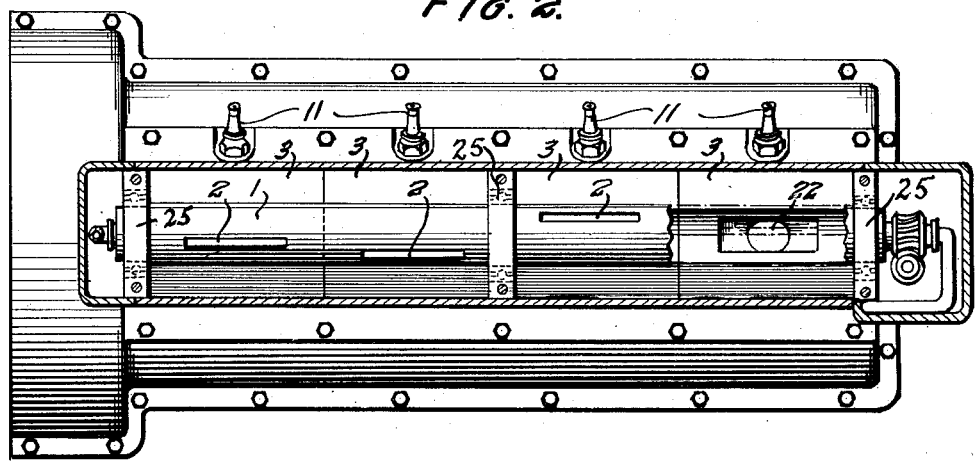
Fig. 2 is a horizontal section immediately above the rotary valve and with a portion of the rotary valve broken away to show the passage 22.

I provide suitable plates 23 and 24 to enclose the bearings and rotary valve as illustrated in Fig. 3, leaving the spark plugs readily accessible. I provide suitable ball bearings 25 for the rotary valve, said ball bearings being positioned respectively at each end of the rotary valve and at the center thereof, in a plane intermediate of the two central engine cylinders, as illustrated in Figs. 1 and 2.

The rotary valve is of uniform diameter throughout except that at each end the rotary valve is of slightly reduced diameter and the end roller bearings 25 are of slightly smaller diameter than the center roller bearing so that a slight annular shoulder will be provided at each end of the rotary valve to abut against the end roller bearings and prevent longitudinal movement of the rotary valve.

In operation the rotary valve rotates to bring the appropriate ports successively into communication with the respective intake passages 6 and the respective exhaust ports 7 and passages 22 communicating with the engine cylinder 21 in the conventional or desired succession such as that used by well known automobile engines similar to the type illustrated.

The bearings are efficiently held in place by the simple but effective expedient of the rings 15 for the bottom bearing 3 and the rings 18 for the upper bearing 4, mounted in grooves in the bearing members and the adjacent portions of the cylinder head construction. This has an important advantage in that it permits of making the bearings of relatively narrow width, thus reducing the size of the head construction to a width substantially less than that of the engine cylinder and producing a more compact construction than has been used heretofore for rotary valves of this type, which in turn decreases the cost of manufacture, as well as increasing the efficiency of operation of the engine. The construction also permits of convenient and efficient oiling of the rotary valve in the manner illustrated in Fig. 3.

What I claim is:

1. In an engine, the combination of a rotary valve having a series of spaced ports therethrough, a lower bearing, an upper bearing, said lower and upper bearings both being of a width substantially less than the diameter of the engine cylinder.

2. In an engine, the combination of a rotary valve having a series of spaced ports therethrough, a lower bearing, an upper bearing, said lower and upper bearings both being of a width substantially less than the diameter of the engine cylinder, annular grooves encircling the ports in each of the aforesaid bearings, correspondingly positioned annular grooves in the adjacent portions of the cylinder head construction, and packing rings in each of the aforesaid annular grooves.

3. In an internal combustion engine, the combination of intake and exhaust ports, said intake and exhaust ports together being arranged substantially in V form, a rotary valve having spaced ports adapted to be placed in communication successively with the intake and exhaust port, an engine cylinder having a top plate, said top plate having a relatively large passage with which the rotary valve ports are adapted to be placed in communication, and bottom and upper bearings in which the rotary valve is mounted, and means for retaining said bearings in their predetermined appropriate position, said means comprising annular packing rings.

4. In an internal combustion engine, the combination of intake and exhaust ports, said intake and exhaust ports together being arranged substantially in V form, a rotary valve having spaced ports adapted to be placed in communication successively with the intake and exhaust port, an engine cylinder having a top plate, said top plate having a relatively large passage with which the rotary valve ports are adapted to be placed in communication, and bottom and upper bearings in which the rotary valve is mounted, and means for retaining said bearings in their predetermined appropriate position, said means comprising a plurality of annular packing rings, said annular rings being seated in annular grooves in the respective bearings and the adjacent portions of the cylinder head construction, as and for the purposes hereinbefore described.

5. In an internal combustion engine, the combination of an intake and exhaust ports, said intake and exhaust ports together being arranged substantially in V form, a rotary valve having spaced ports adapted to be placed in communication successively with the intake and exhaust port, an engine cylinder having a top plate, said top plate having a relatively large passage with which the rotary valve ports are adapted to be placed in communication, and bottom and upper bearings in which the rotary valve is mounted, and means for retaining said bearings in their predetermined appropriate position, said means comprising a plurality of annular packing rings, said annular rings being seated in annular grooves in the respective bearings and the adjacent portions of the cylinder head construction, the packing rings for the upper bearings encircling the intake port only, for the purposes hereinbefore described.

CHRISTIAN C. FOSS.